3,186,789
METHOD OF REMOVING HYDROGEN SULFIDE FROM GASES
Douglas M. Ward, Webster, N.Y., and James D. Shuttler, deceased, late of Kenmore, N.Y., by Ellen J. Shuttler, widow and legal representative, Kenmore, N.Y., assignors to Union Carbide Corporation, a corporation of New York
Filed Mar. 29, 1961, Ser. No. 100,781
2 Claims. (Cl. 23—3)

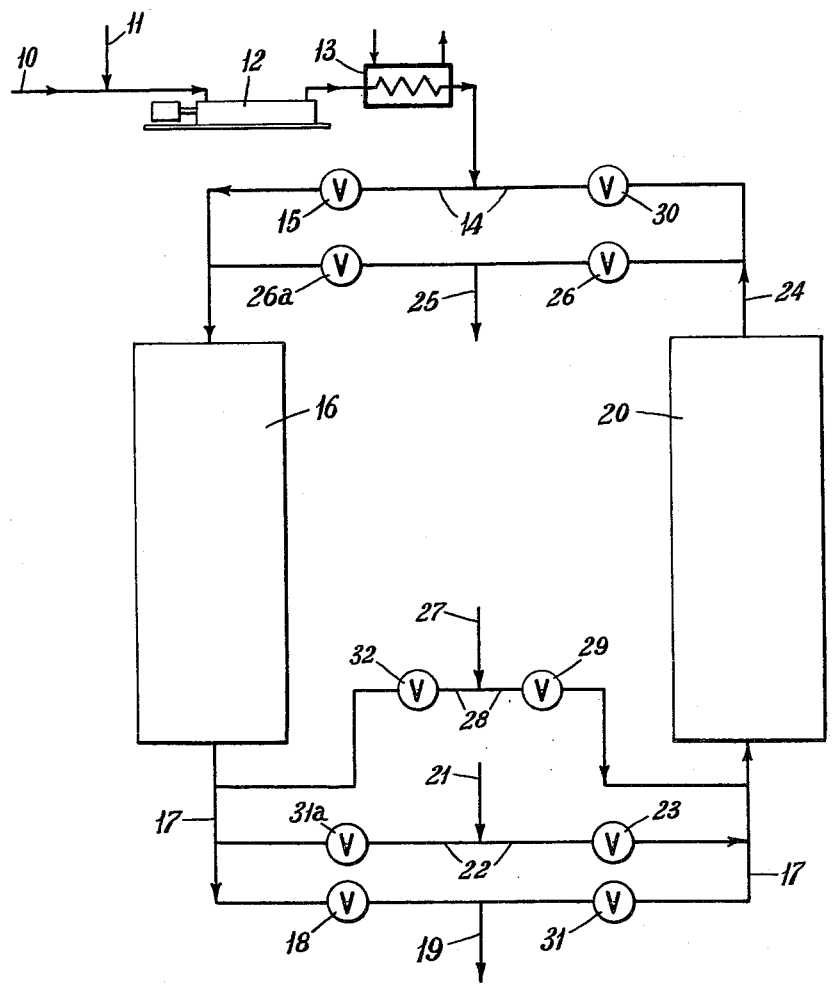

This invention relates to the sweetening or removal of hydrogen sulfide from gases, and more particularly relates to an improved process for sweetening gases by sulfur oxidation in the presence of a catalyst material.

Sweetening of gases such as natural gas streams is extremely important to industry for several reasons. The presence of sulfur-containing compounds in such methane-rich streams may result in the deposition of sulfur salts which can cause plugging and corrosion of transmission pipes, valves, regulators and the like. Also, the sulfur compounds may produce undesirable side reactions with other materials contacting the natural gas stream. For these reasons, gas transmission companies specify that the hydrogen sulfide content of the gas cannot exceed 4 p.p.m. by volume. As used herein, the expression "natural gas stream" refers to a mixture of gases comprising primarily methane with traces of at least the following components as minor constituents: nitrogen, carbon monoxide, carbon dioxide and ethane.

The tremendous increase in demand for natural gas in recent years has made the gas producers far more dependent on "sour" gas fields than ever before. As used herein, a "sour" gas is defined as a gas containing $H_2S$ and/or mercaptans. "Sweetening" is defined as the removal of $H_2S$ and/or mercaptans from a gas or a liquid stream. Formerly, when a gas well came in "sour," it was capped off because the supply and demand situation did not merit its purification. Recently, these capped wells have been put into production and new completions are being utilized regardless of $H_2S$ content.

There are a number of sweetening processes currently being used, but they all have important and critical limitations. One widely used system involves scrubbing by monoethanolamine (MEA). The natural gas is passed through the MEA solution which absorbs the hydrogen sulfide. The solution from the absorption equipment is passed to a stripping column where heat is applied to boil the solution and release the hydrogen sulfide. The lean stripped solution is then passed to heat exchangers, and returned to the absorption equipment to again absorb hydrogen sulfide gas. The principal disadvantages of the MEA system are its high operating cost because of the corrosive nature of the absorbing liquid, and its inability to remove mercaptans from gas streams.

Another prior art system is the iron sponge method of purifying natural gas, utilizing iron oxide impregnated wood chips in a packed bed. The gaseous mixture containing $H_2S$ and/or mercaptans contacts a packed bed of iron oxide sponge, preferably chemically absorbing the sulfur impurities on the exposed iron oxide surface. After the bed has been saturated it is reactivated by passing heated air through the bed. One disadvantage of this method of sweetening natural gas is the hazardous nature of the reactivation step due to the exothermic nature of the reactivation reaction. Furthermore, fusion of iron sponge particles with sulfur frequently causes a high pressure drop through the bed. Finally, the operational cost is high because the absorbent must be replaced frequently.

Hydrogen sulphide has also been removed from natural gas by countercurrent extraction with a hot potassium carbonate solution. In this unit as in the MEA system, the $H_2S$ is removed by chemical combining with potassium carbonate and later released by stripping with steam. One significant disadvantage of this method of sweetening natural gas is that an MEA system must follow the potassium carbonate system to remove the final traces of $H_2S$. Finally, $CO_2$ is also removed from the gas, which is a disadvantage with respect to economies of plant installation, operation and gas shrinkage.

Another example of a gas stream containing objectionable sulfur compound is reformer recycle hydrogen. In the reforming of hydrocarbon oils with a metal oxide dehydrogenation catalyst in the presence of recycled product gas rich in hydrogen, the activity of the catalyst is adversely affected by sulfur-containing compounds. Since the recycled product gas, referred hereinafter as reformer hydrogen, sometimes contains a prohibitively high concentration of sulfur compounds, the prior art has proposed and employed numerous methods for removing these impurities. Unfortunately, all of the prior art schemes have serious limitation and drawbacks. Reformer hydrogen usually contains more than 50% hydrogen as the major constituent, but under some conditions where the net production of hydrogen is low it may fall to about 35% by volume. The remainder of the reformer hydrogen stream is paraffinic hydrocarbons ranging from $C_1$ to $C_9$.

The prior art has employed ethanolamine scrubbing to remove sulfur compounds, but under normal conditions the amine system will only reduce the effluent $H_2S$ concentration to approximately 0.25–1.0 grain $H_2S$ per 100 s.c.f. gas. In many reformer hydrogen purification systems, this is equal to or very close to the inlet $H_2S$ concentrations. Consequently, the amine system is ineffectual in such cases.

The principal object of the invention is to provide an improved process for sweetening gases such as natural gas and reformer hydrogen. Further objects are to provide a process which will sweeten such gases to a high degree of purity, and also permits safe and efficient regeneration of the impurity removal medium. Other objects and advantages of the present invention will be apparent from the subsequent disclosure and appended claims.

The single figure represents a schematic flowsheet of a process for sweetening natural gas in accordance with one embodiment of the invention.

Certain crystalline zeolitic molecular sieves are capable of substantially completely absorbing hydrogen sulfide from natural and other gases. This is due to their strong preference or selectivity for this compound in comparison to other gases. As described and claimed in copending application Serial No. 856,288, filed November 30, 1959, in the name of R. M. Milton, now Patent No. 3,078,634 a feed stream of sour natural gas is passed through a bed of activated zeolitic molecular sieve having an apparent pore size of at least 4.6 Angstroms. The hydrogen sulfide is selectively absorbed in the molecular sieve thereby permitting recovery of a sweet natural gas product.

It has now been found quite unexpectedly that certain naturally occurring and synthetic crystalline zeolites of suitable pore size are also remarkably effective catalysts for the oxidation reaction of hydrogen sulfide and mercaptans to elemental sulfur. These catalysts have been discovered to be characterized by high activity, long life, high selectivity, and possess the unusual property of being self-starting, i.e., of having the ability to initiate the desired oxidation reaction by introducing the free oxygen and hydrogen sulfide-containing gas into the reaction zone at substantially room temperature and permitting the temperature to rise by reason of the exothermic reaction until the desired temperature of reaction is obtained.

The surprisingly high activity exhibited by certain crystalline zeolitic molecular sieves for catalyzing chemical reactions of sulfur may be attributed to their unique adsorptive properties. The ionic pore system of the sieves provides much stronger sorption bonding of polar sulfur compounds than the surfaces of common adsorbents such as alumina. This stronger sorption provides the improved catalytic effect. On the other hand, non-polar material such as the paraffinic hydrocarbons are not so strongly adsorbed in the sieves and are thus not activated to the same extent for chemical reaction.

According to the present invention, a process is provided for sweetening a gas stream containing hydrogen sulfide impurity in which the gas stream is contacted with a catalyst consisting of crystalline zeolitic molecular sieve material having an apparent pore size of at least 4.6 Angstrom units. The contacting is in the presence of free oxygen at temperature below 700° C. so as to produce elemental sulfur. The elemental sulfur is separated from the gas stream and an impurity-depleted gas stream is recovered.

The term "apparent pore size," as used herein, may be fined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. Any of this space not occupied by reduced elemental metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large scale catalyst and adsorption uses. Pelletizing methods are known which are very satisfactory because the sorptive character of the zeolite, both with regard to selectivity and capacity, remains essentially unchanged.

The pore size of the zeolitic molecular sieves may be varied by employing different metal cations. For example, sodium zeolite A has an apparent pore size of about 4 Angstrom units whereas calcium zeolite A has an apparent pore size of about 5 Angstrom units, so that only the latter is suitable for practicing the present invention.

Among the naturally occurring zeolitic molecular sieves suitable for use in the present invention are faujasite, erionite and calcium cation-rich chabazite. The natural materials are adequately described in the chemical art. The preferred synthetic zeolitic molecular sieves include zeolites L, T, X, Y and divalent metal cation-exchanged forms of zeolite A as exemplified by calcium zeolite A.

Zeolite A is a crystalline zeolitic molecular sieve which may be represented by the formula:

$$1.0 \pm 0.2 \, M_{\frac{2}{n}}O : Al_2O_3 : 1.85 \pm 0.5 \, SiO_2 \, YH_2O$$

wherein M represents a metal, n is the valence of M, and Y may have any value up to about 6. The as-synthesized zeolite A contains primarily sodium ions and is designated sodium zeolite A. Calcium zeolite A is a derivative of sodium zeolite A in which about 35 percent or more of the exchangeable sodium cations have been replaced by calcium. Similarly, strontium zeolite A and magnesium zeolite A are derivatives of sodium zeolite A wherein about 35 percent or more of the exchangeable sodium ions have been replaced by the strontium or magnesium ions. Zeolite A is described in more detail in U.S. Patent No. 2,882,243 issued April 14, 1959.

Zeolite T is a synthetic crystalline zeolitic molecular sieve whose composition may be expressed in terms of oxide mole ratios, as follows:

$$1.1 \pm 0.4[xNa_2O : (1-x)K_2O] : Al_2O_3 : 6.9 \pm 0.5 SiO_2 : yH_2O$$

wherein "x" is any value from about 0.1 to about 0.8 and "y" is any value from about zero to about 8. Further characterization of zeolite T by means of X-ray diffraction techniques is described in U.S. Patent No. 2,950,952 issued August 30, 1960.

Zeolite X is a synthetic crystalline zeolitic molecular sieve which may be represented by the formula:

$$0.9 \pm 0.2 M_{\frac{2}{n}}O : Al_2O_3 : 2.5 \pm 0.5 \, SiO_2 : yH_2O$$

wherein M represents a metal, particularly alkali and alkaline earth metals, n is the valence of M, and y may have any value up to about 8, depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244 issued April 14, 1959.

Zeolite L is described and claimed in U.S. Patent application Serial No. 711,565 filed January 28, 1958, and now abandoned.

Zeolite Y is described and claimed in U.S. Patent application Serial No. 728,057 filed April 14, 1958, and now abandoned.

One skilled in the molecular sieve art would normally conclude that sieves having apparent pore sizes of at least 4 Angstrom units would be suitable for adsorbing $H_2S$ and catalyzing the oxidation reaction in accordance with the present invention. This is because the critical dimension of $H_2S$ is approximately 3.6–3.9 Angstrom units. Furthermore, sodium zeolite A having an apparent pore size of about 4 Angstrom units will adsorb large quantities of $H_2S$ in a static system, wherein the molecular sieve is simply exposed to an $H_2S$ atmosphere until completely saturated. It will be recognized that static data as measured in a McBain system is commonly employed in the adsorption art to predict the feasibility of dynamic adsorption separations. Contrary to these expectations, it has been found that sodium zeolite A is completely unsuitable for employment in the present invention, because the rate of $H_2S$ adsorption by a 4 Angstrom pre size molecular sieve in a dynamic system is prohibitively low. As used herein, the term "dynamic system" refers to a continuous contact between a moving gas feed stream and a zeolitic molecular sieve bed. Also, the term "critical dimension" refers to the diameter of the circumscribed circle of the cross section of the adsorbate molecule's minimum area. These are calculated from available bond lengths, bond angles and Van der Waals radii.

Furthermore, it has been discovered that when mercaptans are present in the feed gas in excessive quantities, they are most efficiently removed and oxidized by zeolitic molecular sieve catalysts having an apparent pore size of at least 9 Angstrom units, as for example synthetic crystalline zeolites X, Y and L. This is probably due to a combination of the previously discussed adsorption rate effect, and the fact that mercaptans have larger critical dimensions than $H_2S$.

The oxidation reaction may be written as follows:

$$2H_2S + O_2 \rightarrow 2S + 2H_2O \tag{1}$$

The reaction is exothermic and proceeds more rapidly at higher temperatures. However, the contacting temperature must be maintained below about 700° C. so as to avoid permanent damage to the zeolite crystal structure. This temperature may be controlled in a manner well-known to those skilled in the art, as for example by the employment of heat exchange means embedded in the molecular sieve catalyst bed. Alternatively, or in combination with such means, the oxygen concentration may be controlled as by dilution with an inert gas such as nitrogen or carbon dioxide.

The reaction temperature affects the method of separating the gas stream and the elemental sulfur. If this temperature is relatively low, below about 150° C., the elemental sulfur is retained as a solid adsorbate in the crystalline zeolitic molecular sieve. On the other hand, if the reaction temperature of Formula 1 is above about 150° C., the vapor pressure of elemental sulfur is sufficiently high for sulfur to be discharged from the molecular sieve bed along with the other components of the feed gas.

When the elemental sulfur is adsorbed by the molecular sieve catalyst, separation from the impurity-depleted gas stream is achieved by merely discharging the latter from the catalyst bed. The sulfur adsorbate may then be removed by, for example, reaction with an olefin such as ethylene to reduce the elemental sulfur back to the sulfide in the form of hydrogen sulfide gas in accordance with the following formula:

$$C_2H_4 + 2S \rightarrow 2C + 2H_2S \tag{2}$$

In this manner the sulfur is desorbed and carbon is deposited in the molecular sieve. The carbon may be, in turn, oxidized to carbon monoxide or carbon dioxide gas by an oxygen-containing gas at temperatures between about 400° C. and 700° C., thereby completing regeneration of the crystalline zeolitic molecular sieve catalyst. Such regeneration methods are described and claimed in copending applications Serial Nos. 824,643 and 26,822 filed July 2, 1959, and May 4, 1960, respectively, in the name of R. L. Mays et al., now Patents Nos. 3,069,362 and 3,069,363, respectively.

Alternatively, the elemental sulfur adsorbate may be removed from the molecular sieve catalyst for regeneration of the latter by direct complete oxidation with free oxygen at a temperature of at least 400° C. in accordance with the following formula:

$$S + O_2 \rightarrow SO_2 \tag{3}$$

Instead of complete oxidization, the sulfur may be partially oxidized with free oxygen at a temperature of about 350° C. to produce sulfur dioxide gas and vaporous elemental sulfur effluent.

Other satisfactory methods of removing the elemental sulfur adsorbate thereby reactivating the sieve for reuse include heating the catalyst above the vaporization temperature of sulfur, about 550° C., and stripping the sulfur vapor using an inert gas such as nitrogen.

As a still further reactivation method, the elemental sulfur may be dissolved out of the molecular sieve using a liquid solvent such as carbon disulfide after which the latter may be removed by, for example, inert gas stripping.

Variations of these regeneration methods may also be employed. For example, the elemental sulfur-containing molecular sieve may be contacted with a feed stream containing a substantial concentration of hydrogen sulfide and sufficient oxygen for the sulfur-producing Reaction 1, and the heat of this reaction utilized to vaporize the elemental sulfur deposit from the sieve.

The free oxygen may be supplied for the $H_2S$ Reaction 1 in a number of various forms. For example, it has been found that certain natural gas sources contain small quantities of free oxygen, e.g. 0.2 mol percent, and the quantities are sufficient for the oxidation to proceed in the presence of the described crystalline zeolitic molecular sieve catalysts.

Probably the most attractive source of free oxygen is atmospheric air, but in those cases where dilution of the feed stream is undersirable, pure oxygen gas may be preferred.

When the elemental sulfur is formed in the vapor state, the impurity may, for example, be separated from the remaining constituents of the feed gas by condensation with a colder fluid, as for example, water.

Referring now to the single figure, the inlet gas containing hydrogen sulfide impurity is introduced through conduit 10. Air passes through conduit 11 and into conduit 10 where it is mixed in appropriate proportion with the inlet gas. If the gas mixture is not already in a state of substantial compression, such gas is directed through compressor 12 for compression, preferably to a level of about 100 to 1000 p.s.i.g. The compressed gas may be directed through heater 13 for rewarming to the desired temperature as, for example, 100° C. The warmed gas mixture is then directed through branch conduit 14 and control valve 15 therein to a first crystalline zeolitic molecular sieve bed 16 for contacting therewith. Hydrogen sulfide is selectively adsorbed by the molecular sieve catalyst and the oxidation Reaction 1 proceeds with the formation of elemental sulfur. Since the reaction temperature is relatively low, the elemental sulfur is retained within the inner cagework of the molecular sieve catalyst-adsorbent, and an impurity-depleted gas is discharged from first molecular sieve bed 16 into conduit 17. This product gas flows through control valve 18 and is passed through joining conduit 19 for consumption or storage as desired.

During the on-stream stroke of first molecular sieve bed 16, second bed 20 is being reactivated by removal of the elemental sulfur adsorbate. This may be accomplished by any of the previously described methods but, as illustrated, heated ethylene gas at, for example, 150° C. is introduced through conduit 21, joining conduit 22 and control valve 23 therein, to second zeolite bed 20 for counter-current flow therethrough. During this flow the previously deposited elemental sulfur is reduced in accordance with Formula 2 and hydrogen sulfide gas is formed. The latter is discharged through the opposite end and vented from the system through communicating conduit 25 and control valve 26.

As previously discussed, elemental carbon is deposited in second bed 20 during Reaction 2 and such carbon may be burned by the introduction of heat oxygen gas at about 400° C. Such gas is preferably fed to the system through conduit 27 to communicating conduit 28 and flow control valve 29 therein. A carbon-containing gas is formed during this oxidation reaction, and the latter is discharged from second bed 20 through communicating conduits 24 and 25 as was the carbon-containing gas.

In this manner, second molecular sieve bed 20 is regenerated and prepared for reuse as an oxidation catalyst. When the pores of the first bed 16 becomes sufficiently clogged with elemental sulfur, second bed 20 is placed onstream and first bed 16 is regenerated in the previously described manner. Since the two beds are preferably piped in paralleled flow relationship, this switchover may be readily accomplished by closing valve 15 and opening valve 30 in inlet conduit 14, and by closing valve 18 and opening valve 31 in product discharge conduit 17. For removal of the elemental sulfur adsorbate from first bed 16, it is necessary to close valve 23 and open valve 31 in conduit 22, and also close valve 26 and open valve 26a in conduit 25. When the elemental sulfur has been converted to hydrogen sulfide, the deposited carbon may be removed by oxidation with oxygen introduced through conduit 28 and valve 32 therein.

It can be seen from the foregoing description that this embodiment provides a continuous source of hydrogen sulfide-depleted product gas by periodically switching the flows between first and second crystalline zeolitic molecular sieve beds 16 and 20, respectively.

The invention is also illustrated by the following experiment in which oxygen-containing natural gas with hydrogen sulfide impurity added was contacted with calcium A zeolite catalyst, and elemental sulfur deposited therein. The impurity-depleted natural gas was discharged from the bed and the sulfur removed by reduction with ethylene to hydrogen sulfide gas. The natural gas was mainly methane and contained 0.17–2.9 mol percent ethane and 0.20–0.27 mol percent oxygen. The catalyst-adsorbent in the form of 272.3 grams of 1/16 inch bonded pellets was charged to a 1-inch IPS stainless steel pipe which was 30 inches long. The length of the molecular sieve bed was 24 inches and the bed volume was 0.012 cu. ft. An automatic cycling apparatus was set up so that the feed gas, desorption and cool down stroke durations could be adjusted at will.

During the first 133 complete cycles, the feed gas mixture contained 1.04 mol percent $H_2S$, 1.3% $H_2O$ and 97.66 mol percent of natural gas which was olefin-free. The oxidation-adsorption stroke was conducted at ambient temperature (24° C.), substantially atmospheric pressure, and had a duration of 36 minutes with a feed gas flow of 44.21 cubic feet per hour. Desorption was conducted at 200° C. at about atmospheric pressure for 28 minutes with a flow of 2.4 cubic feet per hour of olefin-free, dry natural gas product. The cycle was completed by cooling for 16 minutes using 75 cubic feet per hour of commercially pure nitrogen gas at 24° C. After 133 cycles the capacity of the sieve to adsorb $H_2S$ had dropped to 61% of its original capacity and the calcium zeolite A had gained 8.9% in weight through buildup of residue. It was later determined that this buildup was primarily elemental sulfur deposits. After 171 cycles the adsorption capacity for $H_2S$ was 64.7% of the original and the weight gain through impurity deposition was 8.05%.

During the period from 171 to 204 cycles the feed gas was 10 mol percent $H_2S$ and 90 mol percent $N_2$, and the purge was 100% $N_2$. From 204 to 344 cycles the feed gas was 1.04% $H_2S$, 1.30% $H_2O$ and 97.66% $N_2$ and the purge was 100% $N_2$. The substitution of nitrogen for natural gas resulted in stable operation with no further change in the $H_2S$ adsorption capacity of the calcium A zeolite, or residue content of the molecular sieve.

From cycle 344 to cycle 492, olefin-free natural gas was used for the purge, and the $H_2S$ adsorptive capacity of the molecular sieve again decreased while the residue content increased. Samples were taken from the upper, middle and bottom sections of the calcium A molecular sieve bed and found to contain 12.1, 9.9 and 4.5% sulfur, respectively.

To regenerate the elemental sulfur-containing calcium A zeolite a portion of the material from the middle and the bottom sections of the bed was placed in a glass column and the latter was externally heated while passing gaseous ethylene therethrough. The effluent from the column was passed through a bulb containing a strip of moist lead acetate paper. At a bed temperature of 150° C. the effluent just contained sufficient $H_2S$ to turn the moist lead acetate paper brown. This is a specific test for hydrogen sulfide only. The effluent stream was then diverted through a 10% $CdSO_4 \cdot H_2O$ bubbler. Only a slight turbidity occurred at this temperature so the ethylene-molecular sieve contacting temperature was increased to 170° C. At this temperature rapid and abundant precipitation of CdS occurred, which is another test for the presence of $H_2S$. Also, the molecular sieve bed was analyzed before and after contact with ethylene, and the sulfur contents were found to be 7.1 and 1.5 weight percent, respectively.

This experiment shows that hydrogen sulfide impurity-containing natural gas may be purified by oxidation of the impurity to elemental sulfur in the presence of calcium zeolite A catalyst at ambient temperatures and very low oxygen concentrations. Furthermore, it shows that the elemental sulfur may be removed from the molecular sieve by reaction with ethylene to produce hydrogen sulfide gas which is released by the sieve.

Although preferred embodiments of the invention have been described in detail, it is contemplated that modifications of the process may be made and that some features may be employed without others, all within the spirit and scope of the invention.

The significance of the present invention was clearly illustrated by another experiment having as its objective, the determination of whether ethylene would react with elemental sulfur without the presence of molecular sieve catalyst material. In this experiment sulfur flowers powder was placed in a test column and the latter was heated to 200° C. while passing an ethylene purge therethrough. At no time did the effluent react to the previously described lead acetate tests, thereby indicating that the reaction failed to proceed. It thus appears that the presence of molecular sieves is necessary for such reaction.

What is claimed is:

1. A process for sweetening a gas stream containing hydrogen sulfide impurity which comprises: contacting such gas stream with a catalyst consisting of crystalline zeolitic molecular sieve material having an apparent pore size of at least 4.6 Angstrom units, said contacting being in the presence of free oxygen at temperature below 700° C. so as to produce elemental sulfur and sufficiently low for deposition and adsorption of the sulfur in said catalyst; recovering an impurity-depleted stream; and removing the adsorbed sulfur from said catalyst by contacting the catalyst with ethylene at sufficiently high temperature to form hydrogen sulfide, and below 700° C.

2. A process according to claim 1 where the adsorbed sulfur was removed from the catalyst by contacting the catalyst at a sufficiently high temperature to form hydrogen sulfide and where carbon is deposited in said catalyst, comprising thereafter contacting the carbon containing catalyst with free oxygen at sufficiently high temperature to oxidize said carbon and remove same from the catalyst, said temperature being below 700° C.

References Cited by the Examiner

UNITED STATES PATENTS 2,971,824   2/61   Johnson et al. _____ 23—225

MAURICE A. BRINDISI, *Primary Examiner.*